United States Patent
Kang

(10) Patent No.: US 9,490,925 B2
(45) Date of Patent: Nov. 8, 2016

(54) DMB TERMINAL FOR ENABLING SIMULTANEOUS DMB VIEWING AND PHONE CALL AND METHOD THEREFOR

(75) Inventor: Sung-Min Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 1744 days.

(21) Appl. No.: 11/415,751

(22) Filed: May 2, 2006

(65) Prior Publication Data

US 2006/0233373 A1 Oct. 19, 2006

(30) Foreign Application Priority Data

May 17, 2005 (KR) .............. 10-2005-41353

(51) Int. Cl.
*H04K 1/00* (2006.01)
*H04H 40/18* (2008.01)
*H04M 1/725* (2006.01)

(52) U.S. Cl.
CPC ......... *H04H 40/18* (2013.01); *H04M 1/72522* (2013.01); *H04H 2201/20* (2013.01)

(58) Field of Classification Search
CPC ....... H04W 4/16; H04W 88/02; H04W 4/12; H04W 8/22; H04M 1/72583; H04M 3/42042; H04M 2201/38
USPC ........................ 455/414.1, 550.1, 556.1, 567
See application file for complete search history.

(56) References Cited

U.S. PATENT DOCUMENTS

| | | | |
|---|---|---|---|
| 5,890,071 A | 3/1999 | Shimanuki | |
| 6,529,742 B1 | 3/2003 | Yang | |
| 2003/0097659 A1 | 5/2003 | Goldman | |
| 2004/0056985 A1 | 3/2004 | Seong | |
| 2004/0095463 A1 | 5/2004 | Yabuta | |
| 2004/0204020 A1 | 10/2004 | Kuramitsu | |
| 2004/0209644 A1* | 10/2004 | Chang et al. | 455/556.1 |
| 2005/0032507 A1 | 2/2005 | Na et al. | |
| 2005/0070327 A1 | 3/2005 | Watanabe | |
| 2005/0221771 A1* | 10/2005 | Himeno | 455/90.3 |

FOREIGN PATENT DOCUMENTS

| | | |
|---|---|---|
| CN | 1578503 | 2/2005 |
| EP | 1 424 838 | 6/2004 |
| EP | 1 489 818 | 12/2004 |
| EP | 1 501 221 | 1/2005 |
| GB | 2 347 589 | 9/2000 |
| JP | 2004-007537 | 1/2004 |
| JP | 2004-062369 | 2/2004 |

(Continued)

*Primary Examiner* — Liton Miah
(74) *Attorney, Agent, or Firm* — The Farrell Law Firm, P.C.

(57) ABSTRACT

A DMB terminal for enabling simultaneous DMB viewing and call and a method therefore are provided. The DMB terminal has a switch unit for switching an image output path, an audible sound output path, and a key input path between a DMB module and a modem module. The modem module connects the image output path, the audible sound output path, and the key input to the DMB module when the user selects a DMB reception mode. If the user wants to use the modem module during viewing the DMB, the image output path, the audible sound output path, and the key input path are simply switched to the modem module, so that the user can use the modem module without terminating the DMB reception. Thus, the user can continue to view the DMB without interruptions even though he invokes a function of the modem module during viewing the DMB.

15 Claims, 7 Drawing Sheets

(56) References Cited

FOREIGN PATENT DOCUMENTS

| JP | 2004-112806 | 4/2004 |
| JP | 2004-187269 | 7/2004 |
| JP | 2005-045753 | 2/2005 |
| JP | 2005-109819 | 4/2005 |
| KR | 1020050073329 | 7/2005 |
| WO | WO 03/081878 | 10/2003 |
| WO | WO 2004/112372 | 12/2004 |

* cited by examiner

DMB TERMINAL FOR ENABLING SIMULTANEOUS DMB VIEWING AND PHONE CALL AND METHOD THEREFOR

PRIORITY

This application claims priority under 35 U.S.C. §119 to an application entitled "DMB Terminal for Enabling Simultaneous DMB Viewing and Phone Call and Method Therefor" filed in the Korean Intellectual Property Office on May 17, 2005 and assigned Serial No. 2005-41353, the contents of which are incorporated herein by reference.

BACKGROUND OF THE INVENTION

1. Field of the Invention

The present invention relates generally to a terminal for receiving Digital Multimedia Broadcasting (DMB), and in particular, to a DMB terminal having the dual functions of DMB reception and mobile phone call enabled.

2. Description of the Related Art

Recently portable terminals permit the transition between operation states according to a key input from a user. For example, when the user receives or writes a Short Message Service (SMS) message, the controller of his portable terminal transitions from the current operation state to another operation state for performing the SMS function according to a key pressed by the user. This kind of state transition is triggered as the controller senses generation of an event such as input of a predetermined key from the user. A device that performs such an event-triggered state transition is called a "state machine."

Existing mobile phones work based on this state transition mechanism. A DMB terminal, being a kind of mobile phone, is not an exception. FIG. 1 is an event-triggered state transition diagram for a typical DMB terminal. In the illustrated case of FIG. 1, the DMB terminal operates in a User Interface (UI) state 100. The UI state 100 is divided into an idle state 102, a menu state 104 for displaying a predetermined menu, a call state 106 for call termination and call origination, and a DMB state 108 for allowing the user to view DMB.

Referring to FIG. 1, with no key input from the user, the UI state 100 stays in the idle state 102. When the user presses a Menu key to use a specific application, the DMB terminal transitions from the idle state 102 to the menu state 104 to display a menu. Upon incoming of a call or upon call origination from the user, the DMB terminal transitions to the call state 106 in response to the event, for call processing. If the user presses a key designated for DMB viewing, the DMB terminal transitions to the DMB state 108 to receive and output DMB data.

The typical DMB terminal working in the operation states illustrated in FIG. 1 is configured to be in only one operation state at a given time. For instance, upon incoming of a call during providing the DMB service to the user in the DMB state 108, the DMB terminal transitions to the call state 106 for call termination, if the user accepts the incoming call. Thus, the DMB operation in the DMB state 108 is terminated.

As described above, if the typical DMB terminal needs to perform another operation during the DMB service, it transitions to an operation state corresponding to the new operation, terminating DMB reception.

Moreover, if the user needs to call during viewing DMB, he cannot continue to view the DMB because a state transition to the call state takes place to place a call.

SUMMARY OF THE INVENTION

An object of the present invention is to substantially solve at least the above problems and/or disadvantages and to provide at least the advantages below. Accordingly, an object of the present invention is to provide an apparatus and method for enabling a user to continuously view DMB without interruptions, while a DMB terminal carries out another operation during the DMB viewing.

Another object of the present invention is to provide an apparatus and method for enabling a user to view DMB while conducting a call.

The above objects are achieved by providing a DMB terminal for enabling simultaneous DMB viewing and call, and a method therefore.

According to one aspect of the present invention, in a DMB terminal having a DMB module for providing a DMB service and a modem module for providing mobile communication functionality, for enabling simultaneous DMB viewing and call, a DMB-modem switch unit switches an image output path for outputting image information, an audible sound output path for outputting audible sounds, and a key input path for receiving a key input signal from a user to the DMB module or the modem module. A DMB-modem switch controller, upon user selection of an operation mode, controls the DMB-modem switch unit to switch the image output path, the audible sound output path, and the key input path to a module corresponding to the selected operation mode.

According to another aspect of the present invention, in a communication method for enabling simultaneous DMB viewing and call in a DMB having a DMB module for providing a DMB service and a modem module for providing mobile communication functionality, upon user selection of a DMB reception mode, the image output path, the audible sound output path, and the key input path are switched to the DMB module by the modem module. DMB data is output through the audible sound output path and the image output path and a key input is received from a user through the key input path in the DMB module. Upon incoming of a call, the image output path, the audible sound output path, and the key input path are switched to the modem module by the modem module. The incoming call is processed by the modem module to allow the user to conduct a conversation. After processing the incoming call, the image output path, the audible sound output path, and the key input path are switched to the DMB module by the modem module.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

For comprehensive understanding of the present invention, the basic principle of the present invention will be described. In a DMB terminal according to the present invention, a controller is provided with a DMB module for receiving, processing, and outputting DMB data and at least one other module for performing a function other than the DMB reception function. Each application for driving a corresponding module is assigned a different memory working area so that applications can be run concurrently. Therefore, two or more modules can operate simultaneously at a given time.

For this purpose, a switch is further provided to switch an image output path running to a display for outputting image information, an audible sound output path running to an amplifier for outputting audible sounds, and a key input path running from a keypad for providing key input received from a user through the keypad to the controller to the DMB module or the at least one other module. A module serving as a main control module in the controller controls the switching operation. Therefore, if the user wants another function during viewing DMB, he can use the function without terminating the DMB.

Figure 1:
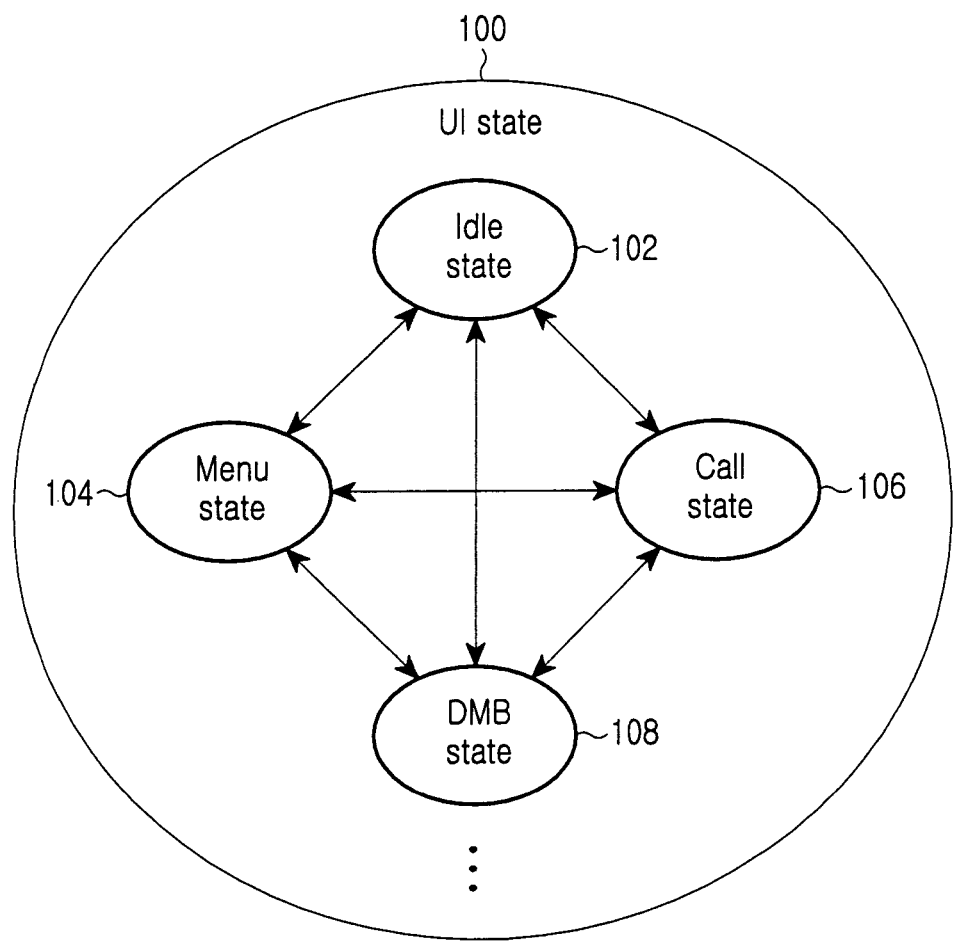
FIG. 1 is a diagram illustrating state transitions triggered by key input in a typical DMB terminal.
Figure 2:
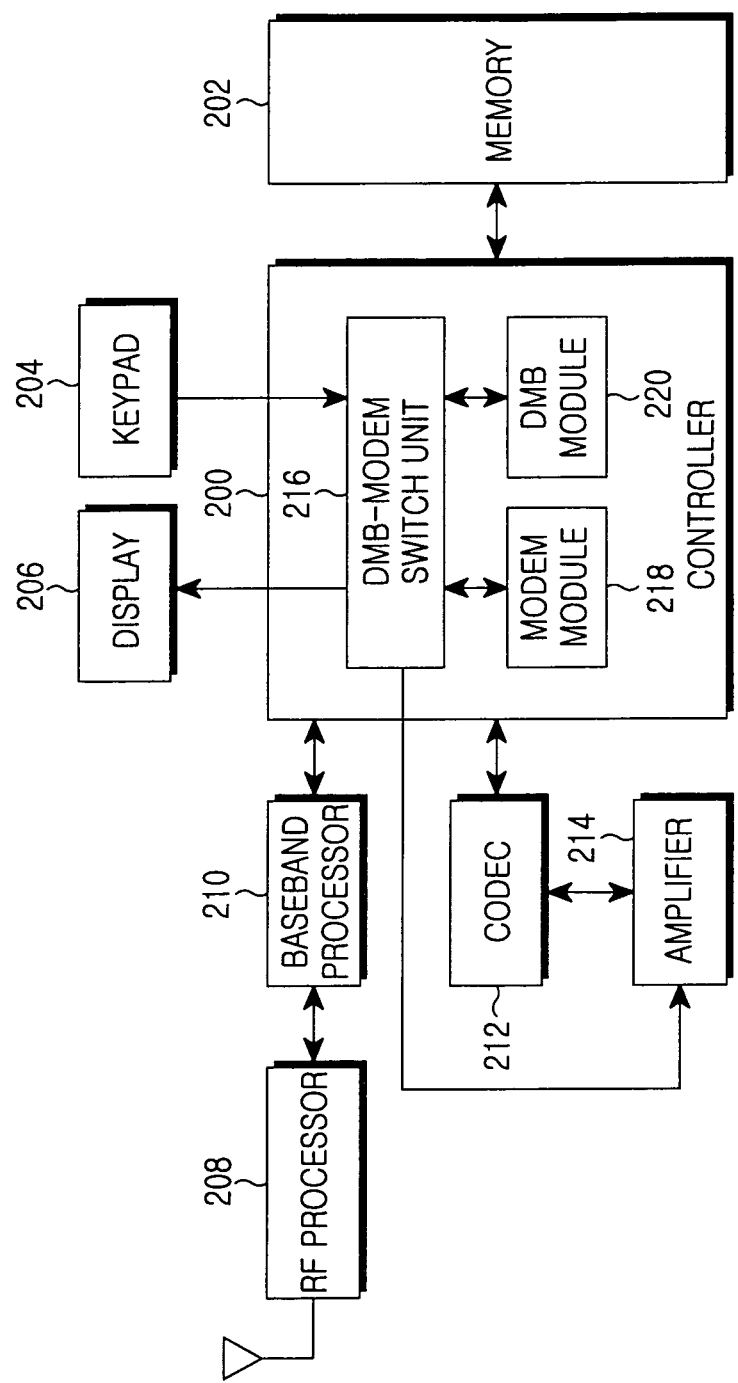
FIG. 2 is a block diagram of a DMB terminal according to an embodiment of the present invention.

FIG. 2 is a block diagram of a DMB terminal according to the present invention. For simplicity, the DMB terminal is assumed to have a DMB module for receiving, processing, and outputting DMB data and a modem module for performing traditional call functionality and data communications.

Referring to FIG. 2, in the DMB terminal, a memory 202, a keypad 204, a display 206, a baseband processor 210, and a Coder-DECoder (CODEC) 212 are connected to a controller 200. The controller 200 includes a modem module 218 for processing phone calls and data communications, and processing audio signals and data according to a wireless Internet connection protocol, and a DMB module 220 for receiving DMB data including video, audio, and information data, decoding the audio data and video data through a DMB audio decoder and a DMB video decoder, respectively, and controlling output of the decoded data. The controller 200 is further provided with a DMB-modem switch unit 216 for switching the modem module 218 or the DMB module 220 to a key input path for receiving a key input signal from the user through the keypad 204, an image output path for outputting image information to the display 206, and an audible sound output path for outputting an audible sound signal to an amplifier 214. While the DMB-modem switch unit 216 can be implemented in hardware, needless to say, it can be implemented also in software such as a switching application. The controller 200 is illustrated in more detail in FIG. 3.

The memory 202 includes a Read Only Memory (ROM), a flash memory, and a Random Access Memory (RAM). The ROM stores programs for processing and controlling in the controller 200, and reference data. The RAM provides a working memory for the controller 200 and the flash memory provides an area for storing updatable data. According to the present invention, the memory 202 has an application for driving a module serving as a main control module and another application for driving another module, and provides a working area to each of the applications, when needed. Hence, the DMB terminal can operate two or more modules at a given time.

The keypad 204 is provided with keys including alphanumerical keys and provides a key input received from the user to the controller 200. According to the present invention, the keypad 204 further has an output switching key. The output switching key is used to invoke an output switching function for switching only the image output path and the key input path to the DMB module 220 during an incoming call process or an outgoing call process in the modem module 218 and thus for allowing the user to view the DMB while conducting a call.

A Radio Frequency (RF) processor 208 transmits/receives an RF signal to/from a base station. It downconverts the received RF signal to an Intermediate Frequency (IF) signal and provides the IF signal to a baseband processor 210 connected to the controller 200. It also upconverts an IF signal received from the baseband processor 210 to an RF signal and transmits the RF signal through an antenna. The RF processor 208 is configured to receive DMB data. The baseband processor 210 is a Baseband Analog (BBA) ASIC that interfaces between the controller 200 and the RF processor 208. The baseband processor 210 converts a digital baseband signal received from the controller 200 to an analog IF signal and provides the analog IF signal to the RF processor 208. It also converts an analog IF signal received from the RF processor 208 to a digital baseband signal and provides the digital baseband signal to the controller 200.

The CODEC 212 is connected to a microphone and a speaker (not shown) via the amplifier 214. The CODEC 212 Pulse Code Modulation (PCM)-encodes a voice signal received through the microphone and outputs the resulting voice data to the controller 200. It also PCM-decodes voice data received from the controller 200 and outputs the decoded signal through the speaker. The amplifier 214 amplifiers the voice signal received through the microphone or the voice signal to be output through the speaker and adjusts the volume of the speaker and the gain of the microphone under the control of the controller 200. Upon receipt of an audible sound signal in DMB data from the controller 200, the amplifier 214 amplifies the audible sound signal and outputs the amplified signal through the speaker.

Figure 3:
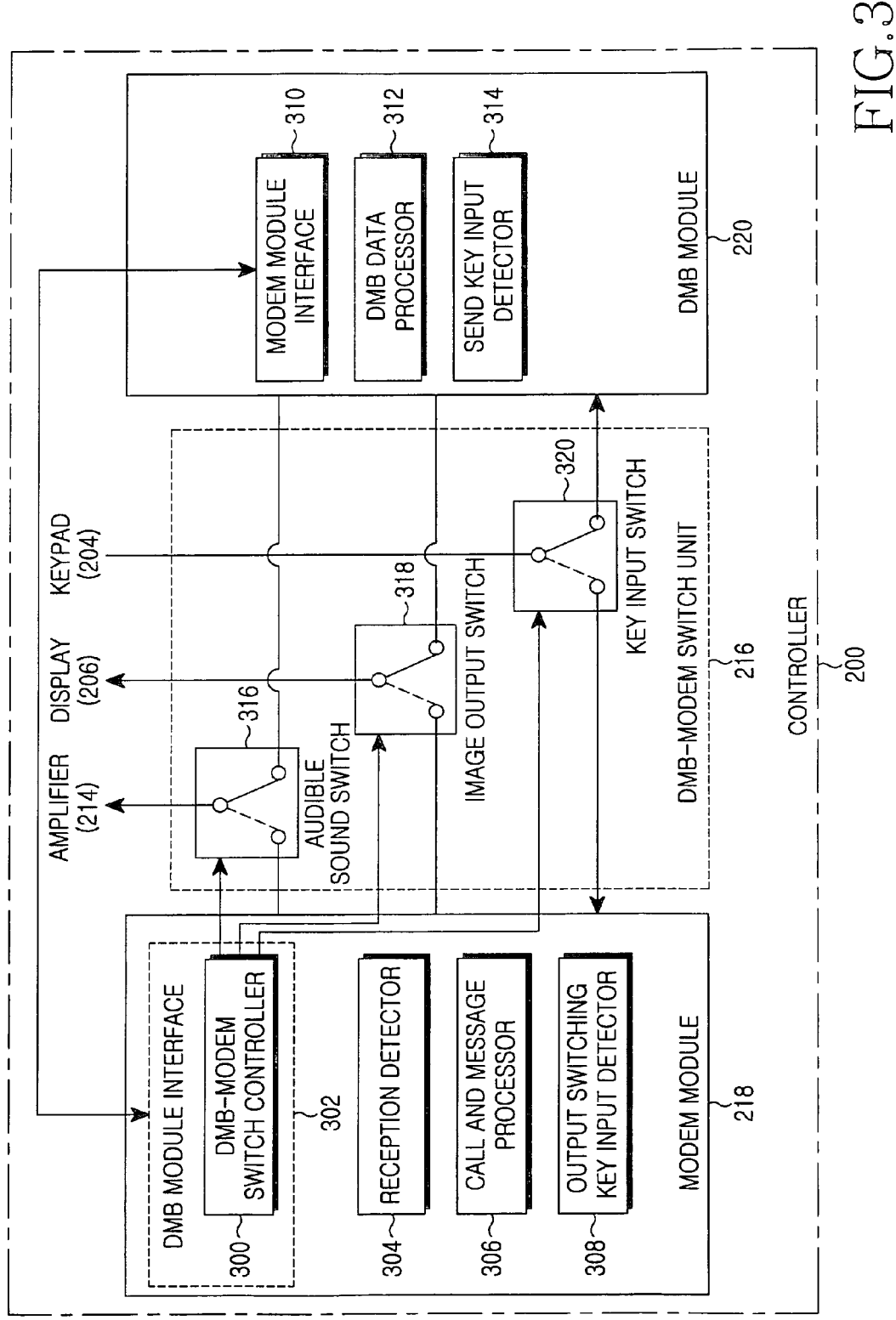
FIG. 3 is a detailed block diagram of a controller in the DMB terminal according to the embodiment of the present invention.

FIG. 3 is a detailed block diagram of the controller 200 in the DMB terminal according to the embodiment of the present invention. Referring to FIG. 3, the DMB-modem switch unit 216 includes an audible sound switch 316 for switching to the audible sound output path, an image output switch 318 for switching to the image output path, and a key input switch 320 for switching to the key input path.

The modem module 218 includes a reception detector 304 for detecting an incoming call or an SMS (Short Message Service)/Multimedia Messaging Service (MMS) message, and a call and message processor 306 for enabling the user to conduct a call upon call termination or call origination, to read the SMS/MMS message upon receipt of the message, or to write and send the SMS/MMS message. If the modem module 218 is a main control module, it is provided with a DMB-modem switch controller 300 for controlling the DMB-modem switch unit 216. The DMB-modem switch controller 216 is a software application implemented to control the DMB-modem switch 216 in the modem module 218. Needless to say, it can be implemented in hardware. The modem module 218 is also provided with a DMB module interface 302 for exchanging signals with the DMB module 220. The DMB-modem switch controller 300 may be incorporated into the DMB module interface 302. The modem module 218 is further provided with an output switching key input detector 308. The output switching key is used to invoke an output switching function for switching only the image output path and the key input path to the DMB module 220 during an incoming call process or an outgoing call process in the modem module 218 and thus for allowing the user to view the DMB while conducting a call.

The output switching key input detector 308 detects input of the output switching key during call processing in the modem module 218. In the state where the key input path is connected to the modem module 218, the output switching key input detector 308 detects input of the output switching key. Thus, the output switching key input detector 308 can be included only in the modem module 218 as illustrated in FIG. 3.

The DMB module 220 has a DMB data processor 312 for receiving, decoding and outputting DMB data and a send key input detector 314 for detecting input of a Send key for originating a call or sending an SMS/MMS message while the DMB module 220 is receiving and outputting DMB data. The DMB module 220 further includes a modem module interface 310, for exchanging signals with the modem module 218.

If the user selects a DMB reception mode, the DMB-modem switch controller 300 of the modem module 218 controls the audible sound switch 316, the image output switch 318, and the key input switch 320 to switch the DMB module 220 to the audible sound output path, the image output path, and the key input path. Thus, the DMB module 220 can output audible sounds to the amplifier 214 and image information to the display 206. Also, a key input signal from the user can be provided to the DMB module 220 through the keypad 204.

In this state, if the user presses the Send key to write an SMS/MMS message or to originate a call, the DMB module 220 detects this event through the send key input detector 314 and transmits a send key input indication signal indicating this event to the modem module 218 through the modem module interface 310. In the modem module 218, the DMB-modem switch controller 300 then controls the audible sound switch 316, the image output switch 318, and the key input switch 320 to switch the audible sound output path, the image output path, and the key input path to the modem module 218. In this case, since the DMB-modem switch controller 300 simply switches those paths, the DMB data processor 312 of the DMB module 220 continues to receive and process DMB data irrespective of the control operation of the DMB-modem switch controller 300. However, since the audible sound output path, the image output path, and the key input path have switched off from the DMB module 220, neither image information and audible sounds of the DMB data are output nor a key input from the user is provided to the DMB module 220.

Upon key input from the user, the modem module 218 sends the written message or processes the outgoing call. When the call processing or message transmission is completed, the DMB-modem switch controller 300 controls the audible sound output path, the image output path, and the key input path to be switched again to the DMB module 220. Therefore, when the user originates a call or writes and sends a message, the DMB terminal can perform call origination or send the message without terminating the DMB reception in accordance with the embodiment of the present invention.

The same thing applies to call termination or message reception during DMB viewing. Yet in this case, upon detection of an incoming call or an incoming SMS/MMS message in the reception detector 304, the DMB-modem switch controller 300 controls the audible sound output path, the image output path, and the key input path to be switched to the modem module 218 until processing of the incoming call or reception of the message is completed. The path switching operation of the DMB-modem switch controller 300 in the case of an incoming call or an incoming message will be described in greater detail with reference to FIGS. 5 and 6.

Figure 4:
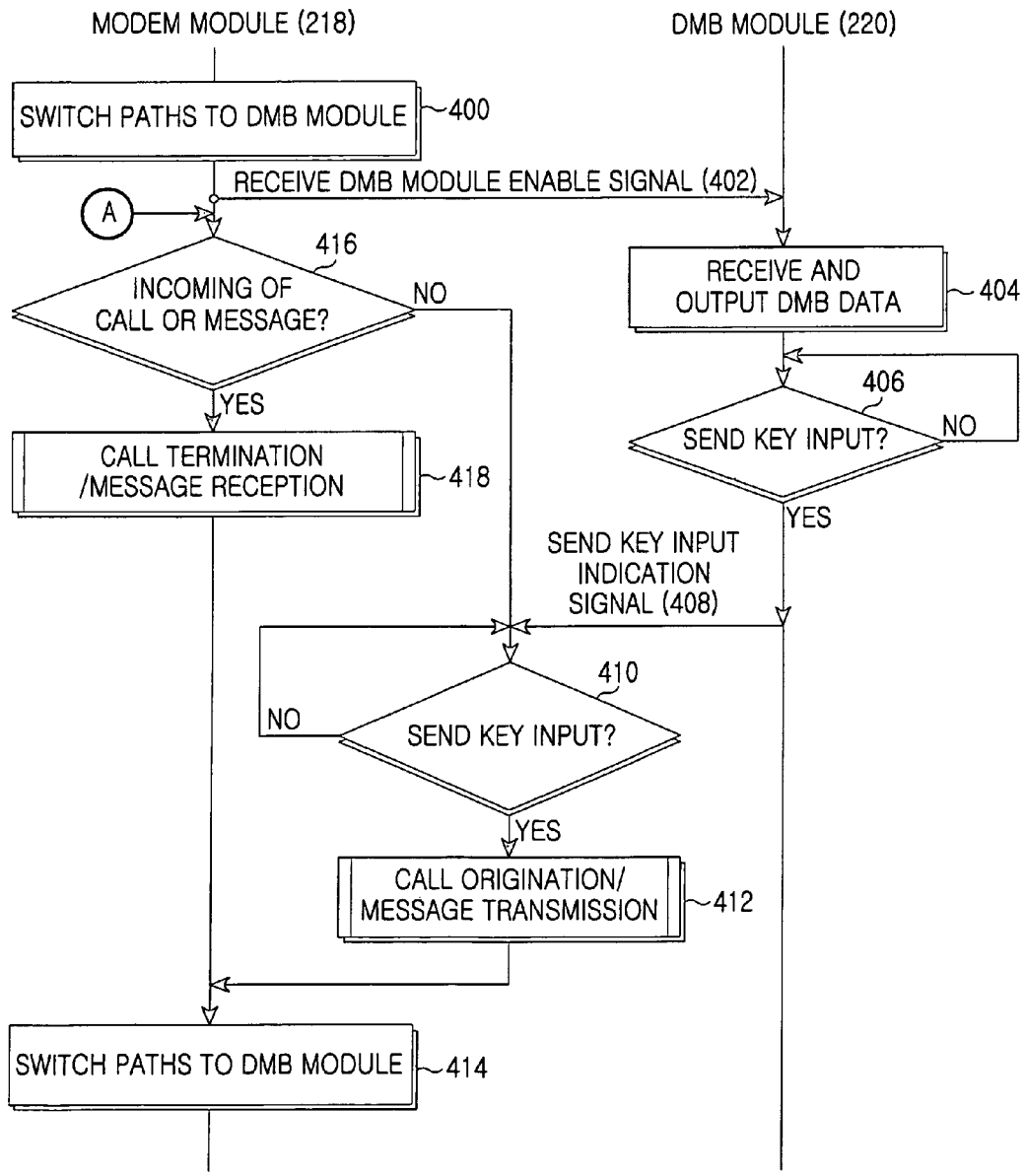
FIG. 4 is a flowchart illustrating a call termination/message reception or call origination/message transmission in the DMB terminal according to the embodiment of the present invention.

FIG. 4 is a flowchart illustrating the operations of the modem module 218 and the DMB module 220 in the controller 200 when the user selects a DMB reception mode in the DMB terminal according to the present invention. These operations are performed under the assumption that the modem module 218 is a main control module.

Referring to FIG. 4, upon user selection of a DMB reception mode, the modem module 218 connects the audible sound output path, the image output path, and the key input path to the DMB module 220 in step 400. In step 402, the modem module 218 applies a DMB module enable signal to the DMB module 220. The DMB module 220 receives DMB data, decodes the DMB data and outputs audible sounds and image information through the audible sound output path and the image output path, respectively in step 404. Upon receipt of a key input from the user, the DMB module 220 determines whether the Send key has been pressed in step 406. Upon input of the Send key, the DMB module 220 provides a send key input indication signal to the modem module 218 in step 408.

In the meantime, after applying the DMB module enable signal to the DMB module 220, the modem module 218 monitors incoming calls or SMS/MMS messages in step 416. Upon receipt of an incoming call or an SMS/MMS message, the modem module 218 connects to the audible sound output path, the image output path, and the key input path, and processes the incoming call or message such that the user can conduct a conversation or read the message in step 418. On the contrary, if neither a call nor a message is incoming, the modem module 218 determines whether the send key input indication signal has been received from the DMB module 220 in step 410. Upon receipt of the send key input indication signal, the modem module 218 connects to the audible sound output path, the image output path, and the key input path, and performs an outgoing call process or an SMS/MMS message writing and sending operation in step 412. Step 412 will be described in more detail with reference to FIG. 5.

After the call termination or message reception in step 418 or the call origination or message transmission in step 412, the modem module 218 connects the audible sound output path, the image output path, and the key input path again to the DMB module 220 in step 414. Notably, the operations of step 418 and step 412 have no effects on DMB reception. In these steps, the modem module 218 simply switches to the audible sound output path, the image output path, and the key input path in steps 412 and 418. Therefore, during the operations in the modem module 218, the DMB module 220 continues to receive and process the DMB data in step 404. As the audible sound output path, the image output path, and the key input path are connected to the DMB module 220 in step 414, an audio signal and a video signal from the DMB data are output through the display 206 and the speaker and a key input from the keypad 204 is provided to the DMB module 220. In this way, even upon an incoming call or an SMS/MMS message during DMB viewing, the user can answer the incoming call and conduct a conversation, or read the SMS/MMS message without terminating the DMB viewing. Also, the user can write and send a message or originate a call without terminating the DMB viewing.

Figure 5:
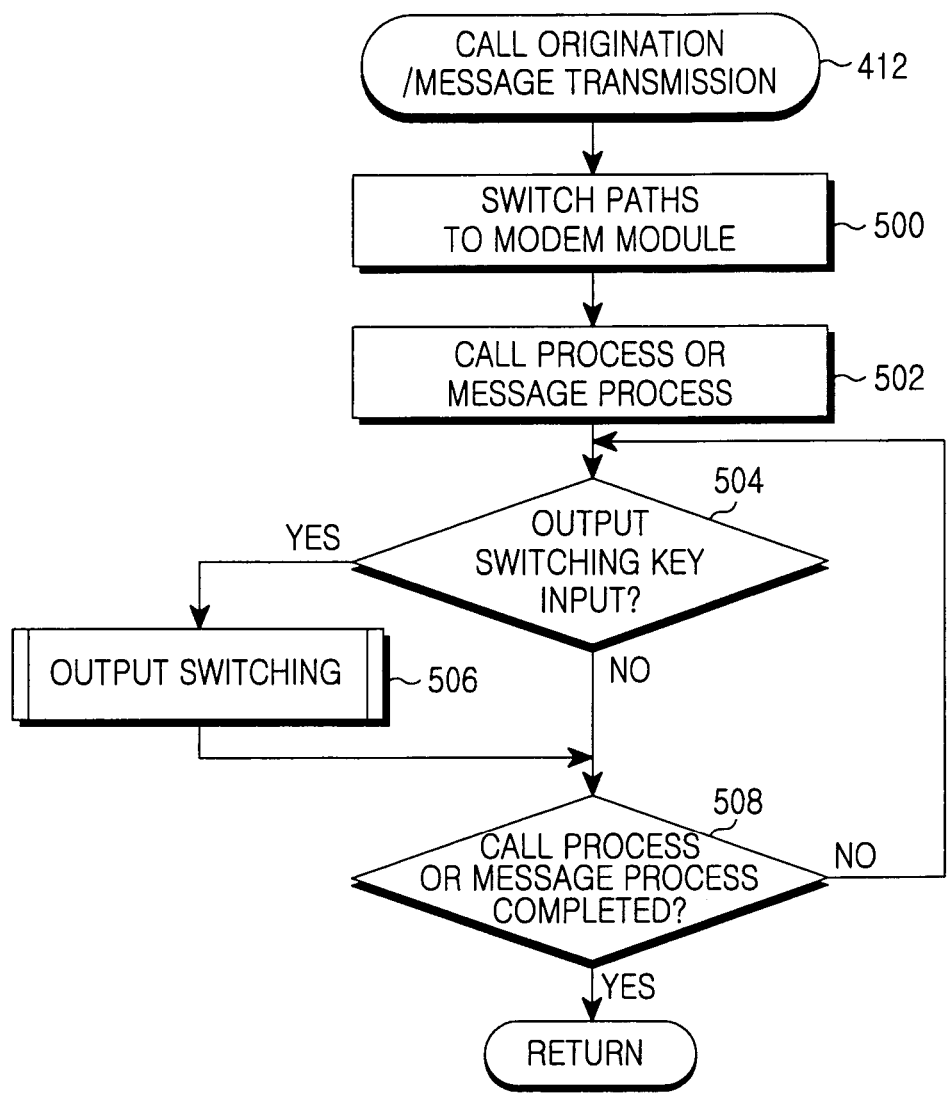
FIG. 5 is a detailed flowchart illustrating the call origination/message transmission in the DMB terminal according to the embodiment of the present invention.

FIG. 5 is a detailed flowchart illustrating the call origination or message transmission in step 412 illustrated in FIG. 4. Referring to FIG. 5, upon user input of the Send key during viewing the DMB, the modem module 218 controls the audible sound switch 316, the image output switch 318, and the key input switch 320 to switch the audible sound output path, the image output path, and the key input path to the modem module 218 in step 500. In step 502, the modem module 218 processes an outgoing call, or enables the user to write and send an SMS/MMS message.

The modem module 218 determines whether the output switching key has been pressed in step 504. Upon input of the output switching key in step 506, the modem module 218 switches the image output path and the key input path to the DMB module 220 so that the output of the DMB module 220 is connected to the display 206 and a key input is provided to the DMB module 220. The output switching key is used to invoke an output switching function for switching only the image output path and the key input path to the DMB module 220 during an incoming call process or an outgoing call process in the modem module 218 and thus for allowing the user to view the DMB while conducting a call. Detection of the input of the output switching key and the accompanying output switching operation will be described in more detail with reference to FIG. 7.

On the other hand, if the output switching key has not been pressed in step 504, the modem module 218 determines whether the outgoing call or message process has been completed in step 508. If the outgoing call or message process continues, the modem module 218 returns to step 504. On the contrary, upon completion of the outgoing call or message process, the modem module 218 controls the audible sound switch 316, the image switch 318, and the key input switch 320 to switch the audible sound output path, the image output path, and the key input path to the DMB module 220. Therefore, during viewing the DMB, the DMB terminal enables the user to write and send a message or to originate a call without interrupting DMB reception in accordance with the present invention. Thus, the user can enjoy the DMB without re-starting the DMB, shortly after the message transmission or the call origination.

Figure 6:
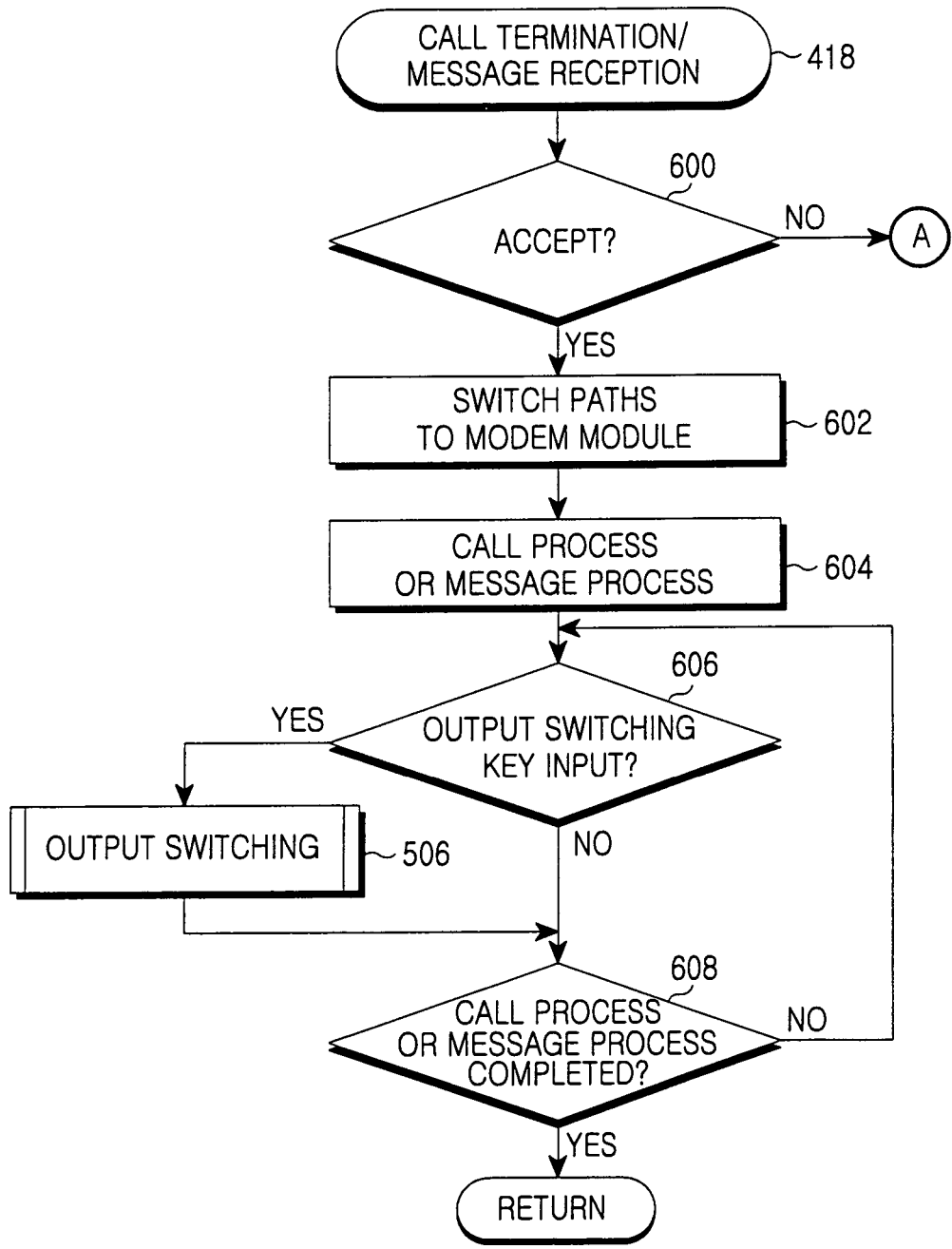
FIG. 6 is a detailed flowchart illustrating the call termination/message reception in the DMB terminal according to the embodiment of the present invention.

FIG. 6 is a detailed flowchart illustrating the call termination or message reception in step 418 illustrated in FIG. 4. Referring to FIG. 6, upon incoming of a call or an SMS/MMS message during viewing the DMB in step 418, the modem module 218 alerts the user to the incoming of the call or the SMS/MMS message in step 600. If the user does not want to accept the incoming call or to read the SMS/MMS message, the modem module 218 returns to step 416. If the user accepts the incoming call or wants to read the SMS/MMS message, the modem module 218 controls the audible sound switch 316, the image switch 318, and the key input path 320 to switch the audible sound output path, the image output path, and the key input path to the modem module 218 in step 602.

In step 604, the modem module 218 processes the incoming call to allow the user to conduct a conversation or processes the received message to allow the user to read the message. The modem module 218 then determines whether the output switching key has been pressed in step 606. Upon input of the output switching key, the modem module 218 switches the image output path and the key input path to the DMB module 220 in step 506. Thus, the DMB module 220 is able to output DMB contents to the display 206 and receive a key input from the user. The output switching key is used to invoke an output switching function for switching only the image output path and the key input path to the DMB module 220 during an incoming call process or an outgoing call process in the modem module 218 and thus for allowing the user to view the DMB while conducting a call. The detection of input of the output switching key accompanied by the output switching will be described in great detail with reference to FIG. 7.

If the output switching key has not been pressed in step 606, the modem module 218 determines whether the call process or the message processing has been completed in step 608. If the call or message process still goes on, the modem module 218 returns to step 606. Upon completion of the call or message process in step 608, the modem module 218 controls the audible sound switch 316, the image output switch 318, and the key input switch 320 to switch the audible sound output path, the image output path, and the key input path to the DMB module 220. In this way, the DMB terminal enables the user to read a received message or to answer an incoming call and conduct a conversation at any time during viewing the DMB, without terminating the DMB. Therefore, after reading the received message or ending the call, the user can return to the DMB without re-starting the DMB.

Figure 7:
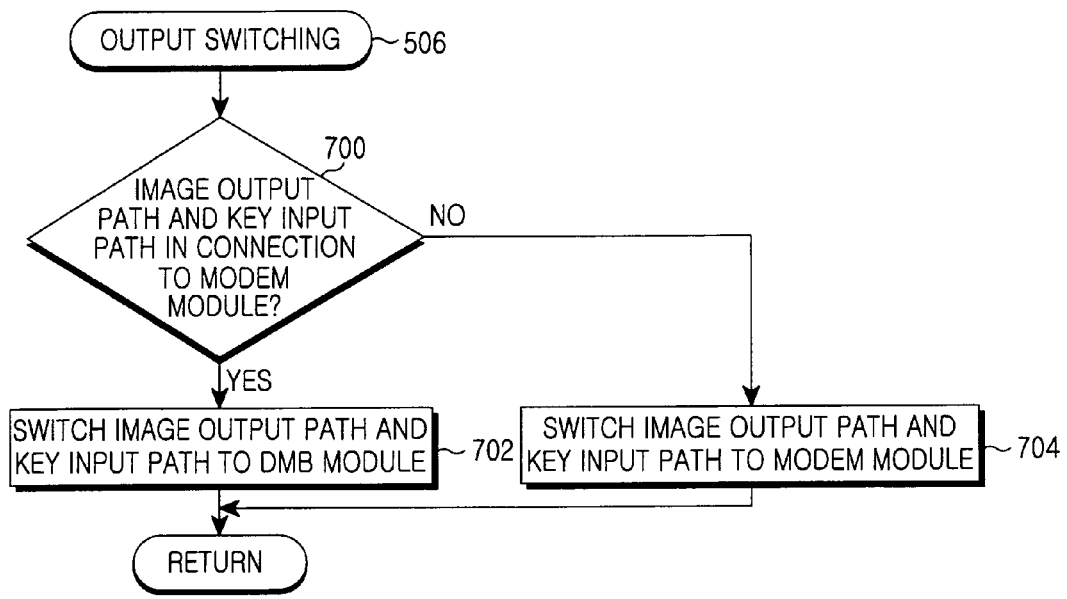
FIG. 7 is a flowchart illustrating an output switching operation upon input of an output switching key during the call termination/message reception or the call origination/message transmission in the DMB terminal according to the embodiment of the present invention.

FIG. 7 is a detailed flowchart illustrating the operation for switching the image output path and the key input path upon input of the output switching key during an incoming call process or an outgoing call process in step 506 illustrated in FIGS. 5 and 6. Referring to FIG. 7, the modem module 218 detects the input of the output switching key in step 504 of FIG. 5 or in step 606 of FIG. 6. The output switching key is configured in hardware on the keypad 204 or in software.

Upon input of the output switching key, the modem module 218 determines whether it has been connected to the image output path and the key input path in step 700. If it has, the modem module 218 controls the image output switch 318 and the key input switch 320 to switch the image output path and the key input path except the audible sound output path to the DMB module 220 in step 702. Thus, even during a conversation, the user can view the DMB on the display 206 and change a broadcast channel by a key input. However, since the audible sound output path is still connected to the modem module 218, the audio signal from the DMB is not output.

On the other hand, if the image output path and the key input path are not connected to the modem module 218 in step 700, the modem module 218 controls the image output switch 318 and the key input switch 320 to switch from the DMB module 220 to the modem module 218 in step 704.

Thus, the audible sound output path, the image output path, and the key input path are all connected to the modem module 218. If the output switching key is pressed a first time, the display 206 is switched to the DMB module 220 to allow the user to view the DMB during a call. If the output switching key is pressed a second time, the display 206 is switched to the modem module 218, for the call. In this way, the user can toggle the display output and key input between the DMB mode and the call mode.

In accordance with the present invention as described above, the DMB terminal is provided with a switch unit for switching an image output path, an audible sound output path, and a key input path between a DMB module and a modem module. The modem module controls the image output path, the audible sound output path, and the key input to be connected to the DMB module when the user selects a DMB reception mode. If the user wants to use the modem module during viewing the DMB, the image output path, the audible sound output path, and the key input path are simply switched to the modem module, so that the user can use the modem module without terminating the DMB reception. Thus, the user can continue to view the DMB without interruptions even though he invokes a function of the modem module during viewing the DMB.

While the invention has been shown and described with reference to a certain preferred embodiment thereof, it is a mere exemplary application. While the function of the modem module has been described in the context of call origination/termination and transmission/reception of an SMS/MMS message, the present invention is not limited to the specific modem module function. The present invention is also applicable to other functions of the modem module during DMB viewing, such as a directory search. In addition, while the present invention has been described in the context of a DMB terminal with a DMB module and a modem module, needless to say, the present invention can be used for a DMB receiver having a Digital Video Broadcasting (DVB) module for receiving, processing and outputting DVB data. Furthermore, the present invention is also applicable to a DMB terminal having a DMB module and a Personal Digital Assistant (PDA) module. Therefore, it will be understood by those skilled in the art that various changes in form and details may be made therein without departing from the spirit and scope of the invention as defined by the appended claims.

What is claimed is:

1. A digital multimedia broadcasting (DMB) terminal for enabling simultaneous DMB viewing and a call function, the DMB terminal having a DMB module for providing a DMB service and a modem module for providing mobile communication functionality, and the DMB module and the modem module being able to operate separately, the terminal comprising:
a DMB-modem switch unit for switching an image output path for outputting image information, an audible sound output path for outputting audible sounds, and a key input path for receiving a key input signal from a user, to the DMB module or the modem module;
a controller for, upon user selection of an operation mode, controlling the DMB-modem switch unit to switch the image output path, the audible sound output path, and the key input path to one of the DMB module and the modem module, corresponding to the selected operation mode; and
the keypad comprising an output switching key for switching only the image output path and the key input path from one of the DMB module and the modem module to another of the DMB module and the modem module while maintaining the audible sound output path at the one of the DMB module and the modem module during an incoming call process or an outgoing call process in the modem module,
wherein the image information comprises a first image of a DMB application when the image output path is switched to the DMB module, and the image information comprises a second image of a call application when the image output path is switched to the modem module.

2. The DMB terminal of claim 1, wherein the modem module includes the controller.

3. The DMB terminal of claim 2, wherein the DMB module includes:
a send key input detector for detecting input of a send key for originating one of a call or writing and sending an SMS or MMS message; and
a modem module interface for providing a send key input indication signal indicating the input of the send key to the modem module.

4. The DMB terminal of claim 3, wherein upon receipt of the send key input indication signal, the controller controls the DMB-modem switch unit to switch the image output path, the audible sound output path, and the key input path to the modem module.

5. The DMB terminal of claim 1, wherein the controller controls the DMB-modem switch unit to switch the image output path, the audible sound output path, and the key input path to the DMB module when the selected operation mode is a DMB reception mode.

6. The DMB terminal of claim 1, wherein the controller controls the DMB-modem switch unit to switch the image output path, the audible sound output path, and the key input path to the modem module when the selected operation mode is a mobile communication mode.

7. The DMB terminal of claim 6, wherein the mobile communication mode is one of a call mode for processing an incoming call or an outgoing call, a short message service (SMS) mode for one of reading an SMS message, or writing and sending an SMS message, and a multimedia messaging service (MMS) mode for one of reading an MMS message, or writing and sending an MMS message.

8. The DMB module of claim 1, wherein when the modem module detects incoming of one of a call, an SMS message or an MMS message, the controller controls the DMB-modem switch to switch the image output path, the audible sound output path, and the key input path to the modem module according to user selection.

9. The DMB terminal of claim 1, wherein the DMB-modem switch unit includes:
an audible sound switch for switching the audible sound output path to the modem module or the DMB module, the audible sound output path being connected to an amplifier;
an image output switch for switching the image output path to the modem module or the DMB module, the image output path being connected to a display; and
a key input switch for switching the key input path to the modem module or the DMB module, the key input path being connected to a keypad.

10. An apparatus for providing a digital broadcasting service,
the apparatus comprising:
a display; and
a controller configured to:

determine whether execution of a call application related to a communication service is requested while displaying a broadcasting application on the display;

when execution of the call application is requested while displaying the broadcasting application on the display, switch an entire screen of the display from a display of the broadcasting application to a display of the call application while continuing to receive broadcasting data, and output audio data of the call application; and when a switching request is inputted while executing the call application, switch the entire screen of the display from the display of the call application to the display of the broadcasting application, while the call application continues to be executed and the output of the audio data from the call application is maintained.

11. The apparatus of claim 10, wherein the controller is further configured to switch the entire screen from the display of the broadcasting application to the display of the call application, when a switching request is inputted while receiving and displaying broadcasting data on the screen and maintaining the audio output of the call application.

12. The apparatus of claim 10, wherein the controller is further configured to:
  determine whether the execution of the call application has completed; and
  switch from the display of the call application to the display of the broadcasting application when the execution of the call application has been completed.

13. A multi-tasking method in a pocket-size, digital broadcasting capable, wireless communication terminal, the method comprising:

determining whether execution of a call application related to a communication service is requested while displaying a broadcasting application;

when execution of the call application is requested while displaying the received broadcasting application on the display, switching an entire screen from a display of the broadcasting application to a display of the call application while continuing to receive broadcasting data, and outputting audio data of the call application; and when a switching request is inputted while executing the call application, switching the entire screen from the display of the call application to the display of the broadcasting application while the call application continues to be executed and the output of audio data from the call application is maintained.

14. The multi-tasking method of claim 13, further comprising:
  switching the entire screen from the display of the broadcasting application to the display of the call application, while receiving and displaying broadcasting data on the screen and maintaining the audio output of the call application, upon the input of the switching request.

15. The multi-tasking method of claim 13, further comprising:
  determining whether the execution of the call application has completed; and
  switching from the display of the call application to the display of the broadcasting application when the execution of the call application has been completed.

* * * * *